United States Patent [19]

Fleurant

[11] 3,741,311
[45] June 26, 1973

[54] TOWABLE THRASHER
[76] Inventor: Rolland Fleurant, St. Jovite, Quebec, Canada
[22] Filed: Nov. 16, 1971
[21] Appl. No.: 199,296

[52] U.S. Cl.................... 172/45, 172/393, 244/108
[51] Int. Cl............................................. A01b 33/00
[58] Field of Search...................... 172/45, 393, 395

[56] References Cited
UNITED STATES PATENTS

| | | |
|---|---|---|
| 2,701,940 | 2/1955 | Carr.................................... 172/45 |
| 2,691,262 | 10/1954 | Swertfeger........................... 172/45 |
| 3,008,526 | 11/1961 | Cohen.................................. 172/45 |
| 3,195,899 | 7/1965 | Neuenschwander.............. 172/45 X |
| 2,706,880 | 4/1955 | Steuerwald ..................... 172/395 X |
| 2,572,203 | 10/1951 | Scheidenhelm et al............ 172/393 |
| 3,263,836 | 8/1966 | Kucera.............................. 172/45 X |
| 2,556,446 | 6/1951 | Roach................................... 172/45 |
| 2,781,624 | 2/1957 | Mountz................................ 172/45 |
| 2,531,732 | 11/1950 | Hoffman.............................. 172/45 |
| 3,211,461 | 10/1965 | Elwick.............................. 172/45 X |

*Primary Examiner*—Robert E. Pulfrey
*Assistant Examiner*—R. T. Rader
*Attorney*—Pierre Lesperance

[57] ABSTRACT

A towable thrasher adapted for comminuting ice, hardened snow and other substances spread on the ground and adapted for operation on rough terrains, such as ski slopes and fields having bushes and for operation on roads and airfields as well. A towable thrasher having a single pair of ground-engaging wheels or skis, an elongated rotary member or drum arranged for rotation about a longitudinal axis thereof overlying the ground-engaging points of the ground-engaging wheels or skis, a motor to rotate the drum, and flexible beater elements secured in spirally arranged series onto the drum to successively hit the substance on the ground upon rotation of the drum. The ground-engaging wheels or skis are adjustable in height relative to the rotary member or drum to adjust the thrashing action.

2 Claims, 22 Drawing Figures

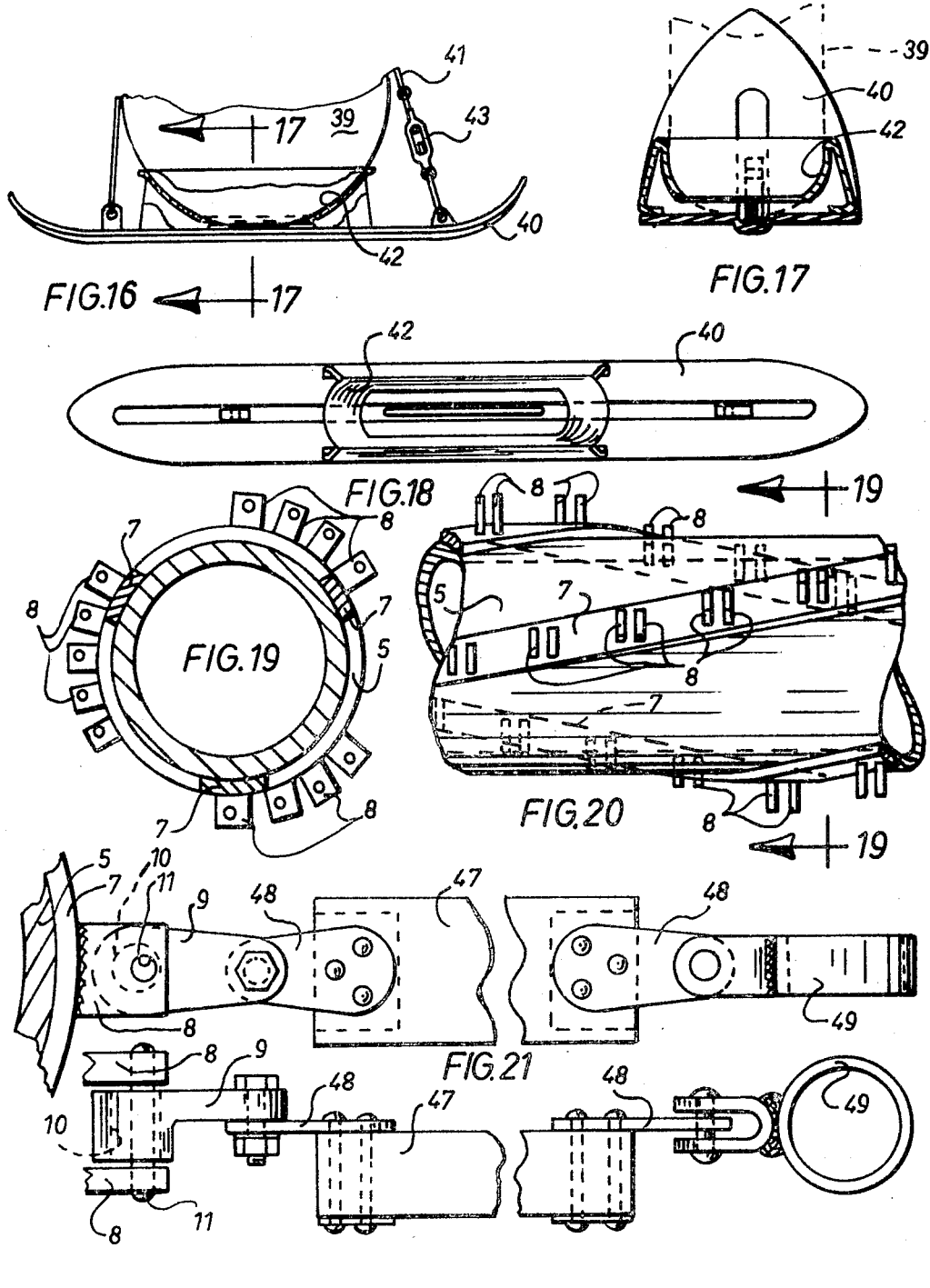

3,741,311

TOWABLE THRASHER

This invention relates to a thrasher for ice and other substances spread on the ground and, more particularly, to a towable thrasher of the rotary beater type.

The ice formation in certain places like ski slopes, roads and airfields is a common problem in many places. Icebreaking equipment of the above type has been proposed for highways and roads. Basically, the icebreaking or thrashing equipments of the above type, proposed so far, are all of the four-wheel type, that is they all have four ground-engaging wheels supporting the icebreaking rotary beater elements. This four-wheel arrangement is adequate for plane and relatively plane surfaces, such as for roads for which they are intended to be used, but they are not adequate for use on ski slopes and off the roads for clearing field from grass, shrubs or the like. One reason for this resides in the fact that the four ground-engaging wheels result in four spaced-apart contacts with the ground and, when any wheel runs over a bump or obstacle, rotary beaters are elevated such that there is reduced and often insufficient engagement thereof with the substance to be thrashed. A further reason is that the ground-engaging wheels cannot satisfactorily be used on the ski slopes, because of the drag they produce when towed in the snow.

An icebreaking device of the above type having flexible beaters have been proposed in the past, with all the beaters arranged in series extending in spaced-apart relationship around the supporting drums, parallel to the longitudinal axes thereof. The above arrangement is found disadvantageous since the series of flexible beaters hit the ground in succession and there results vibration and dynamic unbalance of the supporting drums having the flexible beaters secured thereto. This unbalance is caused by variation of the centrifugal action on the supporting drum, which is due to the fact that the flexible beaters which are in engagement with the ground, are not transmitting centrifugal action to the supporting drums. Therefore, each time a series of flexible beaters hit the ground, there is a sudden change in the centrifugal action on the supporting drum and there results dynamic unbalance.

It is a general object of the invention to provide a towable thrasher of the above type having flexible beaters arranged to substantially eliminate vibration and dynamic unbalance of the rotary member supporting the flexible beaters.

It is a more specific object of the invention to provide a towable thrasher of the above type having flexible beaters secured to an elongated rotary member along spirals extending along and around the same and the flexible beaters are secured at circumferentially equal spacing from one another such as to dynamically balance the rotary member.

It is a general object of the invention to provide a towable thrasher of the above type, which can satisfactorily be used off the roads, for instance on ski slopes and in fields.

It is another general object of the invention to provide a towable thrasher of the above type which is supported by a single pair of ground-engaging elements and an elongated rotary member mounted for rotation about an axis overlying the pair of places of contact with the ground defined by the ground-engaging elements.

It is another object of the invention to provide a towable thrasher of the above type with ground-engaging elements which are adjustable in height relative to the supporting frame thereof to adjust the thrashing action of the rotary beaters.

It is a specific object of the invention to provide a towable thrasher with a casing having a chamber for a drum, which chamber is constructed and arranted to stay clean under the rotating action of the rotary beaters.

It is a further specific object of the invention to provide a towable thrasher of the above type with a rear flap to limit projection and scattering of the comminuted particles or pieces rearwardly of the thrasher.

It is a further object of the invention to provide a towable thrasher of the above type, wherein the rotary beaters are pivotally attached to a supporting drum by excentric bushings arranged to lengthen wear limit thereof.

It is another specific object of the invention to provide a towable thrasher of the above type with ski units adapted to be attached to road wheels thereof to tow the thrasher on ice and snow.

The invention will now be described in detail with reference, by way of example only, to the accompanying drawings, in which:

FIG. 16 is a side view of a ski unit attached to a ground-engaging wheel of a towable thrasher according to the invention;

FIG. 17 is a cross-sectional view as seen along line 17—17 in FIG. 16;

FIG. 18 is a top view of a ski forming part of the ski unit illustrated in FIG. 16;

FIG. 19 is a cross-sectional view as seen along line 19—19 in FIG. 20;

FIG. 20 is a side view of part of a rotary drum to illustrate a spiral arrangement of rotary beaters; and FIGS. 21 and 22 are side and plan views respectively of one type of rotary beaters according to the invention.

Figure 1:
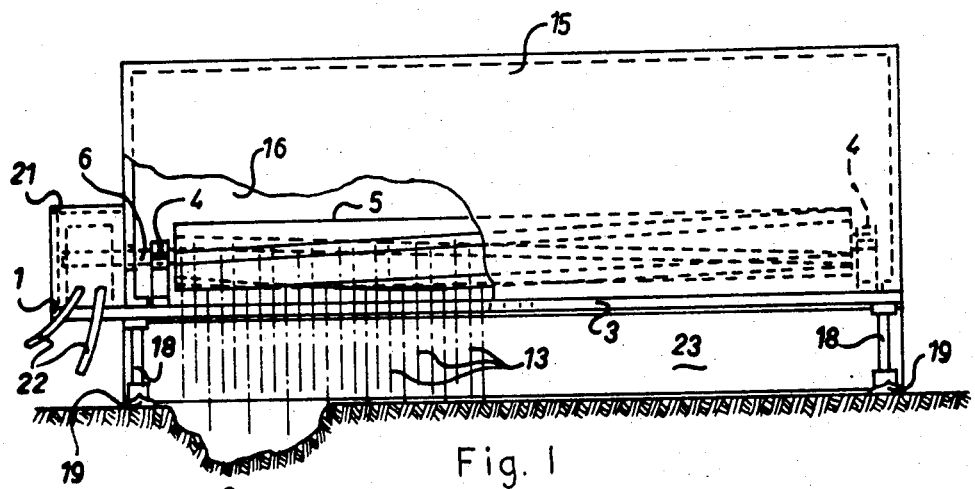
FIG. 1 is a front view, partly broken away, of a thrasher according to the invention.
Figure 2:
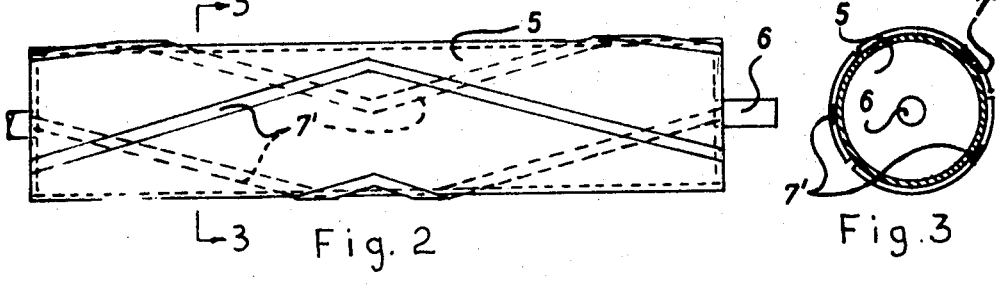
FIG. 2 is a side view of one rotary drum adapted to secure rotary beaters thereto.
Figure 3:
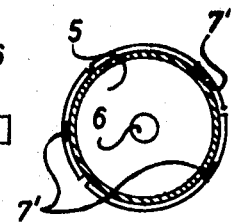
FIG. 3 is a cross-sectional view as seen along line 3—3 in FIG. 2.
Figure 4:
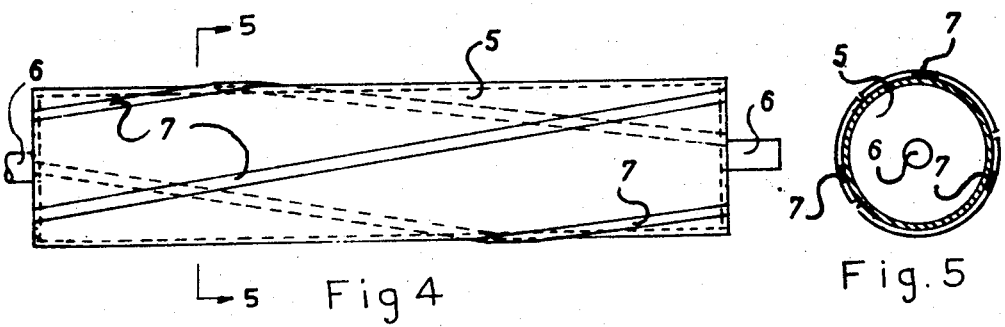
FIG. 4 is a side view of a rotary drum to which rotary beaters can be differently secured.
Figure 5:
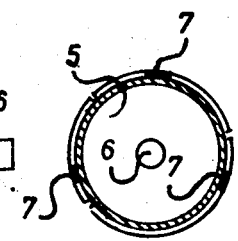
FIG. 5 is a cross-sectional view as seen along 5—5 in FIG. 4.
Figure 6:
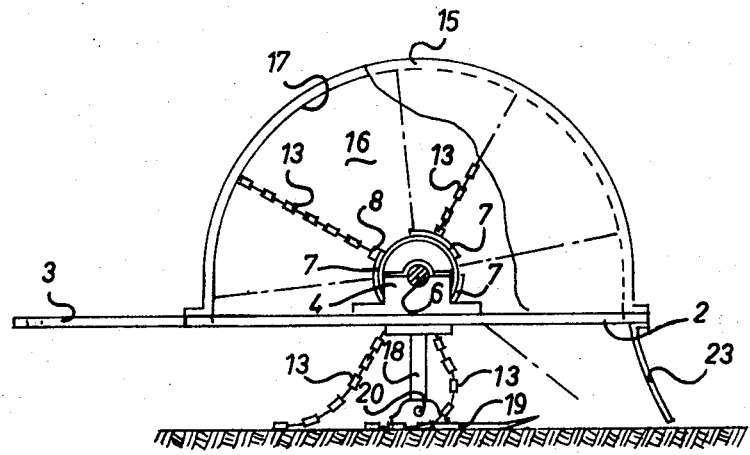
FIG. 6 is a left-hand side view, partly broken away, of the towable thrasher shown in FIG. 1.

Particular reference is made to FIGS. 1 and 6 which illustrate general views of a towable thrasher according to the invention. This towable thrasher includes a planar frame having a pair of side member portions 1 and 2, a front and a rear crossbars, and a hitching bar 3 at the front of the frame to attach the thrasher to a tractor or tracked vehicle, not shown, for operatively towing the same. A bearing 4 is mounted onto each side member portion 1 and 2 intermediate the ends thereof and are transversely aligned. A drum 5 is rotated onto the transversely aligned bearings 4 by stub axles 6 extending at opposite ends of the drum 5, axially thereof. The drum 5 may have, for instance, as shown in FIGS. 4 and 5, three strips or bands 7 of metal fixed thereto and extending in spiral along and around the same and such that each strip 7 forms an unbroken spiral which goes from one end to the other of the drum 5, while rotating about 120° around the same. The three metal strips 7 are equally spaced and arranged around the drum 5 such that any plane extending radially through the surface of the drum 5 intersects at least one metal strip 7. Instead of being arranged in simple spirals, such as in FIGS. 4 and 5, the strips of metal can be arranged in Vs, as illustrated by the strips 71, shown in FIGS. 2 and 3. Obviously, many other arrangements of spiral strips are possible within the scope of the invention, that is such that there is always at least one strip intersecting any radial plane of the drum 5.

Figure 7:
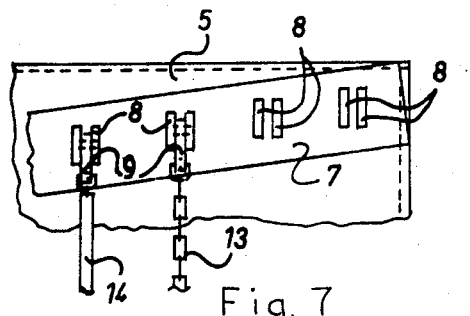
FIG. 7 is a partial view showing how rotary beaters are secured to a rotary drum.
Figure 8:
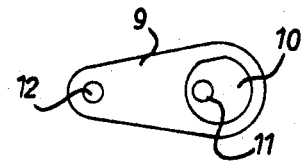
FIG. 8 is a side view of a lever which connects a rotary beater to a supporting rotary drum.
Figure 9:
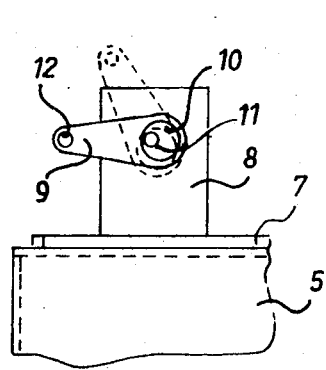
FIG. 9 is a side view showing the cooperative relationship of the lever of FIG. 8 with a rotary drum.

Pairs of ears 8 are fixed onto the strips 7 or 7', as by welding, in equally spaced-apart relationship along the latter, as shown in FIG. 7. A lever 9 having an excentrically bored bushing 10 is pivoted by a pin or the like between the two ears 8 of each pair of ears.

Figure 10:
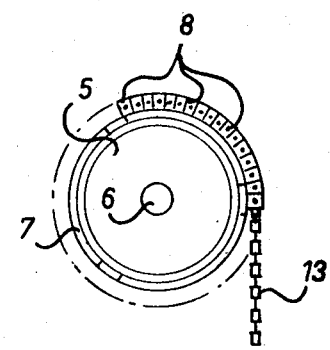
FIG. 10 is an end view of a rotary drum.

It will be noted that the bore 11 of the excentric bushing 10 serves to pivot the lever 9 and is located as far as possible away from the corresponding end of that same lever, whereby to leave as much bushing material as possible on the side thereof placed towards the above corresponding end. The lever 9 is provided with a bore 12 extending transversely through the free end thereof, which serves to secure a flexible beater thereto. Various types of flexible beater elements can be used without departing from the spirit and scope of the invention. As shown in FIGS. 6, 7, and 10, the flexible beaters can be made of chains 13 having the same length and secured into the holes 12. In FIG. 7, there is shown another flexible beater 14 which includes a length of strap of, for instance, leather. The flexible beater 14 will be described in detail hereinafter with reference to FIGS. 21 and 22.

It must be noted that the flexible beaters 13 or 14 are secured to the pairs of ears 8 along the strips 7 at circumferentially equal spacing from one another, such that there is always substantially the same number of flexible beaters in engagement with the ground, resulting in a uniform centrifugal action on the flexible beaters and the supporting drum.

A casing 15 is fixed onto the side member portion 1 and 2 and the afore-mentioned front and rear crossbars of the frame. The casing 15 forms a chamber 16 defining a semi-cylindrical surface 17 extending coaxially with the transverse axis of the drum 5 and above the latter. The longitudinal side walls of the casing 15 project downwardly and form an opening at the bottom of the latter. The flexible beaters 13 and 14, or any other type used, are made of such length relative to the radius of the cylindrical surface 17 that the tips at the free end thereof will pass close to that cylindrical surface without touching the same when they are propelled by rotation of the drum 5. This is found advantageous to produce self-cleaning of the chamber 16.

A vertical leg 18 is fixed endwise under each side member portion 1 and 2 and extends downwardly therefrom. A ski 19 is pivotally connected at the lower end of each vertical or upright leg 18 by a transverse pin 20 and the like to form a pair of ground-engaging members for the towable thrasher.

A hydraulic motor 21, of any suitable type, is mounted on the shelf-like side member portion 1 and is drivingly connected to the stub axle 6 at the corresponding end of the drum 5 to rotate the latter. Hydraulic lines or hoses 22 are connected to the hydraulic motor 21 to supply hydraulic fluid thereto. A flexible flap 23 is fixed to the rear of the thrasher and hangs therefrom edgewise towards the ground and lengthwise of the drum 5.

Figure 11:
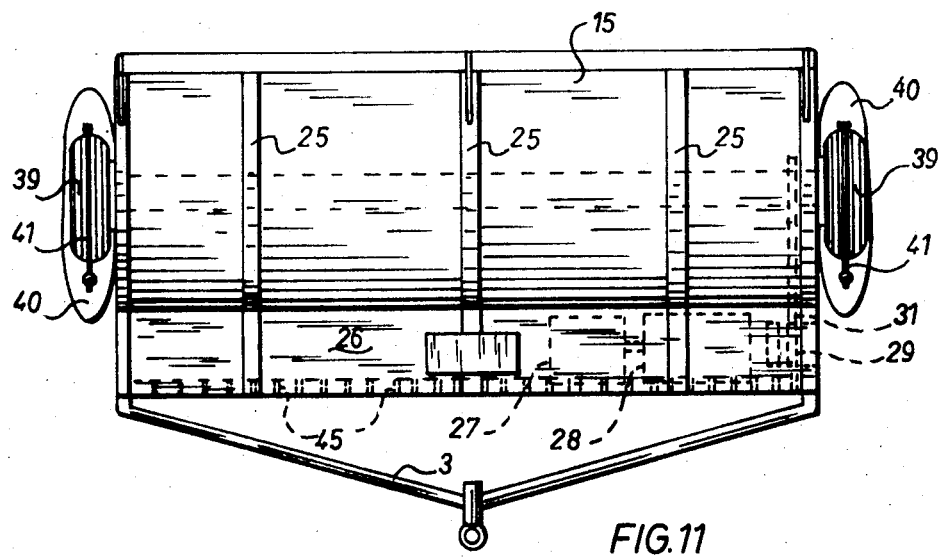
FIG. 11 is a top view of a towable thrasher according to the invention.
Figure 12:
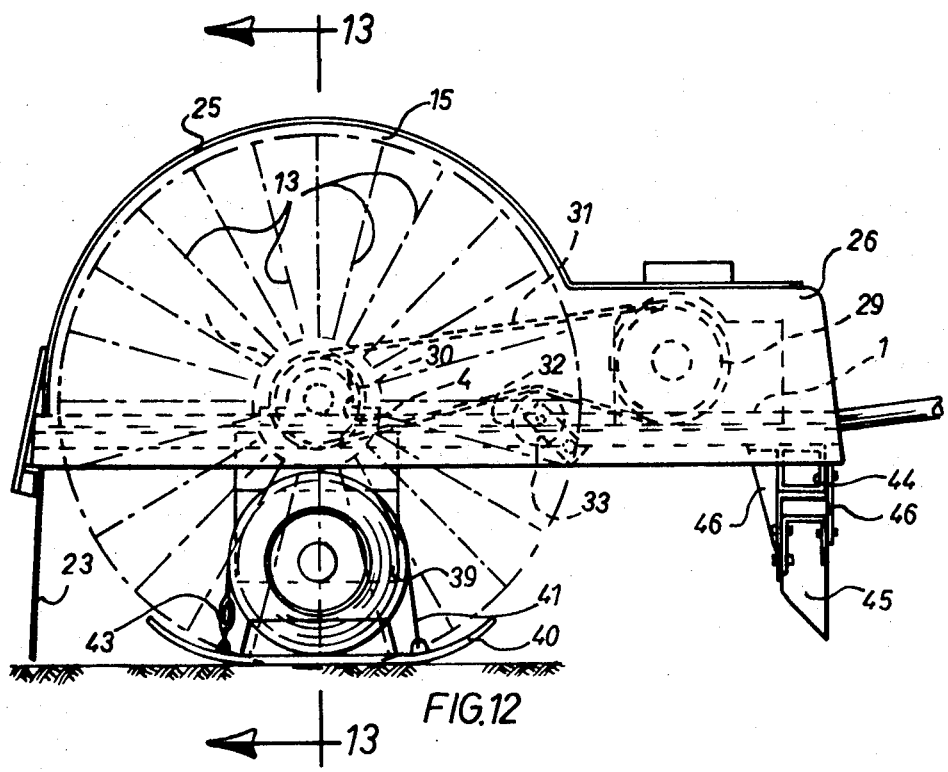
FIG. 12 is a right-hand side view of the towable thrasher shown in FIG. 11.
Figure 13:
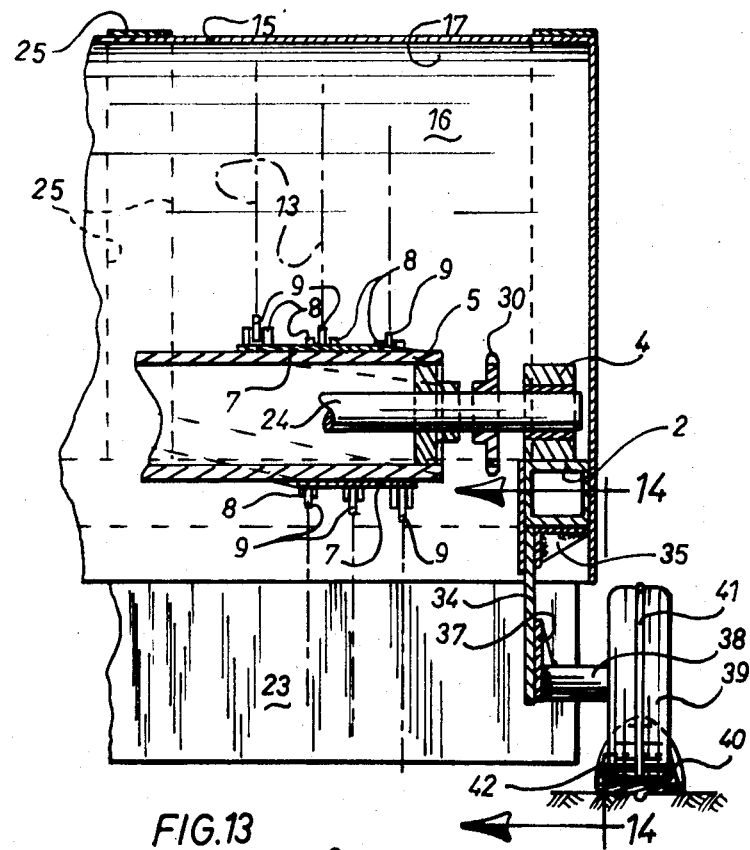
FIG. 13 is a cross-sectional view as seen along line 13—in FIG. 12.

FIGS. 11, 12, and 13 show general views of a towable thrasher according to the invention and provided with other features of the invention. The elements in FIGS. 11 to 22 inclusive, which are similar to above-defined elements, will be identified by the same reference numerals.

As shown in FIG. 13, said member portions 1 and 2 are represented by longitudinal beams of square cross-section. A hitching bar, or element 3 of tubular cross-section, is fixed to the frame at the front thereof. Bearings 4 are also provided onto the beams 1 and 2. A drum 5, as above described, has a longitudinal axle 24 which extends axially therethrough and outwardly at both ends thereof and is journalled at those ends into the bearings 4. The casing 5 forming the chamber 16 and having a cylindrical surface 17 is provided with reinforcing bands 25 circumferentially fixed on the outside face thereof. The casing 15, illustrated in FIGS. 11, 12, and 13 is provided with a front extension 26 forming a housing for an internal combustion engine 27 adapted to be mounted inside thereof onto the frame of the thrasher, for a transmission 28 connected to the motor 27, and for a battery and a gas tank which are not shown. The motor 27 drives a driving sprocket 29, which is drivingly connected to a driven sprocket 30 by a link chain 31. A tensioning sprocket 32 is pivotally mounted by a lever 33 to engage the chain 31 and to adjustable tension the same. As can be seen, the energization of the engine or motor 27 will produce rotation of the drum 5, and the associated flexible beater elements 13 and 14, only schematically represented, which will operate as previously described. The flexible flap 23 is also mounted at the rear of the frame or casing 15 and extends lengthwise of the drum 5 and edgewise towards the ground.

An upright plate 34 is fixed to each beam 1 and 2 and projects downwardly therefrom. A bracket 35, of angular cross-section, is fixed to the upright plate 34 to rigidly mount the latter relative to the corresponding side member portions or beams 1 and 2.

The upright plate 34 is provided with an upright row of holes 36 along each vertical edge thereof. A wheel support 37 having an upright plate portion is fixed by bolts, or the like, against the upright plate 34 in registry with selected holes 36 to position the same at the desired height. A stub axle 38 is fixed to each of the two wheel supports 37, one on each side of the frame, projects outwardly therefrom, and is arranged to rotatably mount a road wheel 39 thereon.

Ski units each including a ski 40 and a retaining harness 41 attached thereto are provided to convert the towable thrasher for snow and ice-covered ground operation. The ski 40 is formed with a wheel cavity 42 to contain a road wheel 39 therein. The retaining harness 41 is constituted of a length of wire attached at both ends to a ski 40 and provided with a turnbuckle 43 to tighten the retaining harness around a road wheel 39.

The stub axles 38 are aligned transversely of the vehicle and arranged relative to the drum 5, such that the axis of the latter overlies the places or points of engagement of the road wheels 39 or skis 40 with the ground for optimum performance of the thrasher. This arrangement is advantageously particularly for field operation, since the drum 5 always stays parallel to an imaginary line joining said places or points of engagement with the ground and, therefore, directly follows the transverse inclination of the ground, the same as the road wheels and the skis do.

A cross beam 44 is fixed to the frame of the thrasher, at the front thereof. A series of scarifying teeth 45 are fixed in laterally spaced-apart relationship along the cross beam 44 and point downwardly from the latter to scarify or scratch the substance, such as, for instance, hardened snow or ice spread on the ground. Plates or brackets 46 are provided to rigidly fix the teeth 45 to the cross beam 44.

The flexible beater element 14, which is schematically illustrated in FIG. 7, will now be described in detail with reference to FIGS. 21 and 22. The flexible beater element 14 includes a strap 47, for instance of leather, having a metal connector 48 fixed at each end thereof. One connector 48 is pivoted to the lever 9 by a pin engaging through the bore 12 thereof. The other connector 48 is pivotally connected to a metal tubular member, preferably a metal nipple 49 which is arranged so that the axis of its through bore is normally substantially tangent to the plane of rotation of nipple 49 about the rotational axis of drum 5. Nipple 49 forms a hard tip at the free end of the flexible better element 14, which tip is particularly important for efficiently comminuting ice and hardened snow since the ice communited thereby will freely pass through nipple 49. Thus, the amount of ice or snow thrown by the beater elements will be kept at a minimum and also the resistance to drum rotation produced by the nipples 49 when hitting and going through the ice to be broken down.

It must be understood that it is within the purview of the invention to construct towable thrashers which are intermediate the simpler, lighter and inexpensive model illustrated in FIGS. 1 and 6 and the more sophisticated model illustrated in FIGS. 11, 12, and 13. Such intermediate models may comprise intermediate combinations of the features of both above models. For instance, the model of FIGS. 1 and 6 can be provided with road wheels and ski units, with or without the height adjustment elements, as shown in FIGS. 11, 12, and 13. Similarly, the hydraulic motor 21 can be replaced by the internal combustion engine and vice versa.

Figure 14:
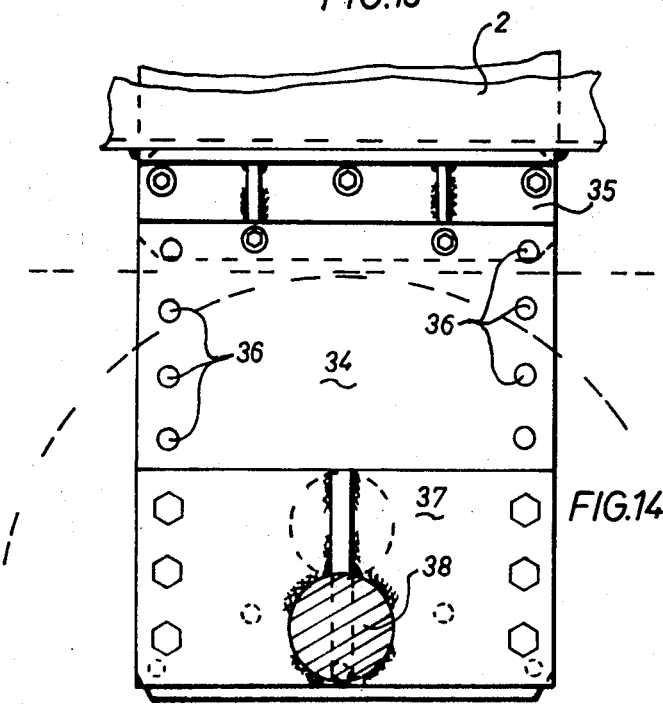
FIG. 14 is a cross-sectional view as seen along line 14—14 in FIG. 13, with the removed casing.
Figure 15:
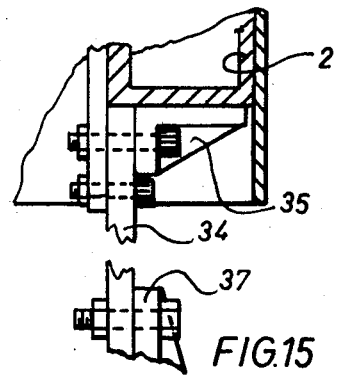
FIG. 15 is an enlarged view of a portion of FIG. 13.

The height adjustment elements, particularly illustrated in FIGS. 13, 14, and 15, allow to vary the height of the drum 5 above the ground and thereby to adjust the thrashing action of the flexible beater elements 13 or 14, as the case may be, to suit any particular condition of operation.

What I claim is:

1. In a thrasher for communiting a substance on the ground and including a frame, a power-driven elongated rotatable drum carried by said frame above ground and a plurality of elongated flexible beater members with inner and outer ends and pivotally mounted at their inner ends along the length of said drum and rotatable with said drum, to each take a radial position under centrifugal force, each beater member carrying at its outer end a metal tip member adapted to hit the substance to be communited, said tip member consisting of a short tubular member with opposite ends and open at both ends to define a through bore and arranged with the axis of said through bore normally substantially tangent to a plane of rotation about the rotational axis of said drum member, whereby the communited substance may freely pass through said tubular member, wherein said beater member comprises a strap-like element and said metal tip is pivotally connected to the outer end of the said strap-like element for rotation about an axis parallel to the axis of rotation of said drum, said drum carries a pair of spaced ears for each beater member, said ears rigidly protrude from said drum, a pivot pin fixed to and extending between the outer ends of said pair of ears and parallel to the rotational axis of said drum, a bushing eccentrically mounted on said pivot pin, a metal lever pivotally mounted on said pin and by means of said bushing and connected to the inner end of said strap member, said bushing having its maximum thickness radially towards the axis of rotation of said drum.

2. A towable thrasher for communiting a substance on the ground, comprising a substantially rectangular planar frame having plural long and short sides, a generally semi-cylindrical casing with a curved portion and having end walls, said casing secured to said frame at its periphery and having its curved portion extending above the same, an elongated rotatable drum member extending coaxially within said casing and journalled on said frame at its end portions, power-operated drive means mounted on said frame and drivingly connected to said drum member to rotate the same, hitching means carried by an extension of said frame and located opposite the center of a long side of said frame and spaced from said long side, bracket means depending from each of the short sides of said frame, a ground-engaging tire wheel freely rotatably carried by the lower end of each bracket means for rotation about an axis parallel to the axis of rotation of said drum member and spaced vertically below the latter when said frame is in horizontal position, a ski releasably attached to each wheel, said ski having a top wheel receiving cavity in which the tire of said wheel is located, wire means attached at both ends to said ski surrounding said tire and a turn buckle attached to said wire means to tighten the same around said wheel tire, and a plurality of elongated flexible beater members pivotally mounted at their inner ends along the length of said drum member and rotatable with said drum to take radial position relative to the drum under centrifugal force, each beater member carrying at its outer end a metal tubular tip member having a through bore normally substantially tangent to its plane of rotation about the rotational axis of said drum member and adapted to hit the substance to be communited, the communited substance being free to pass through the tubular member.

* * * * *